Patented Apr. 7, 1936

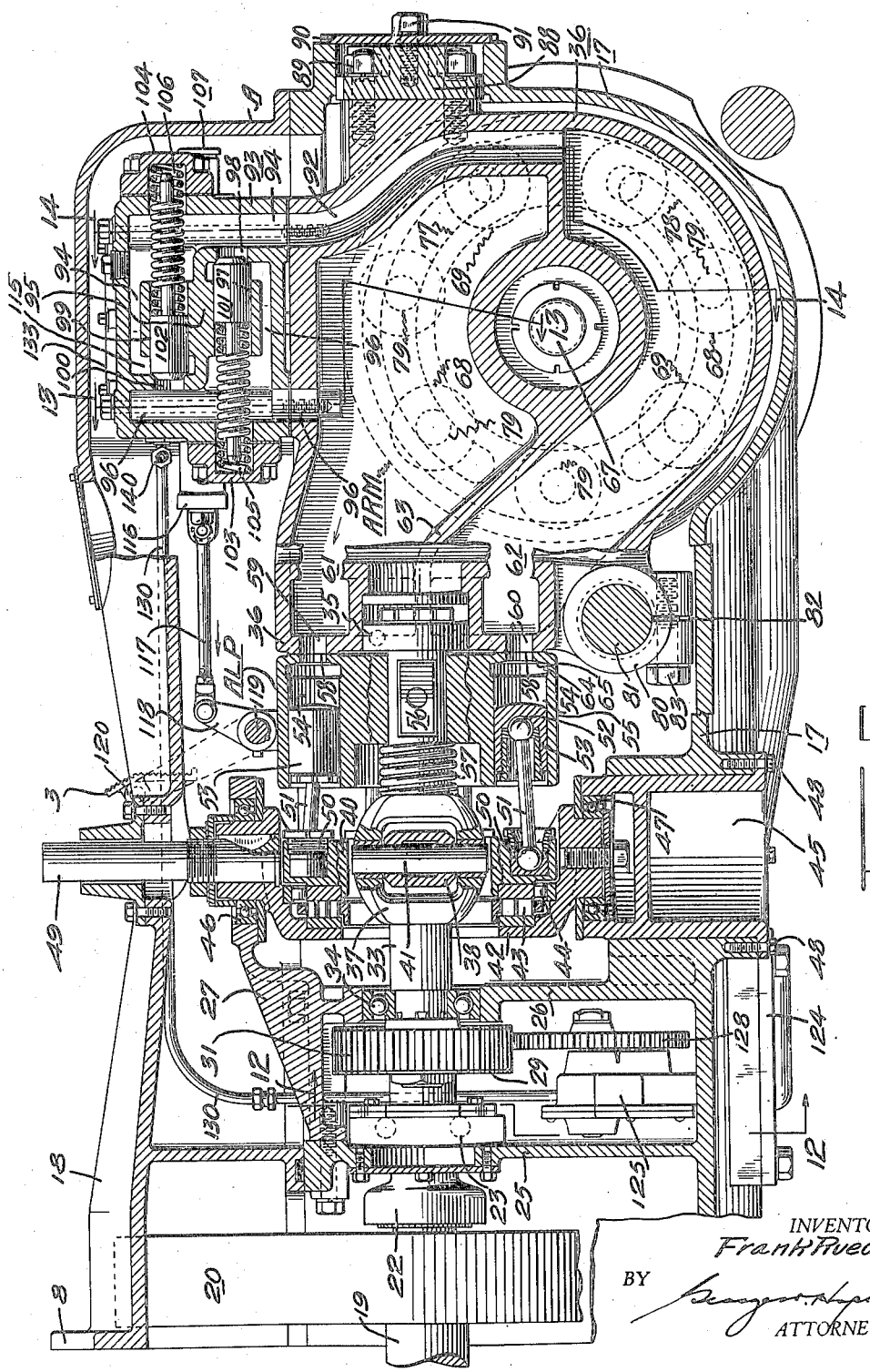

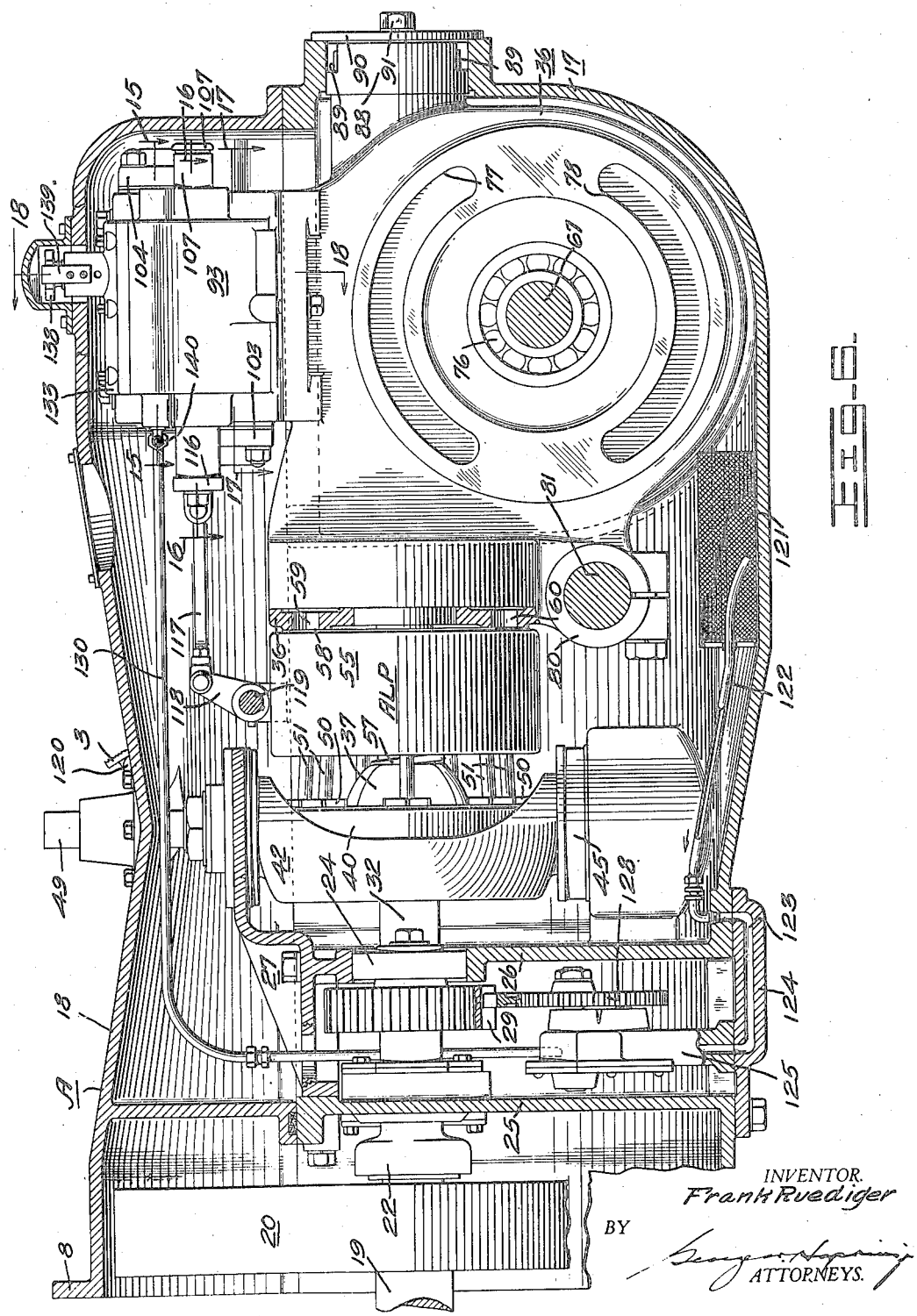

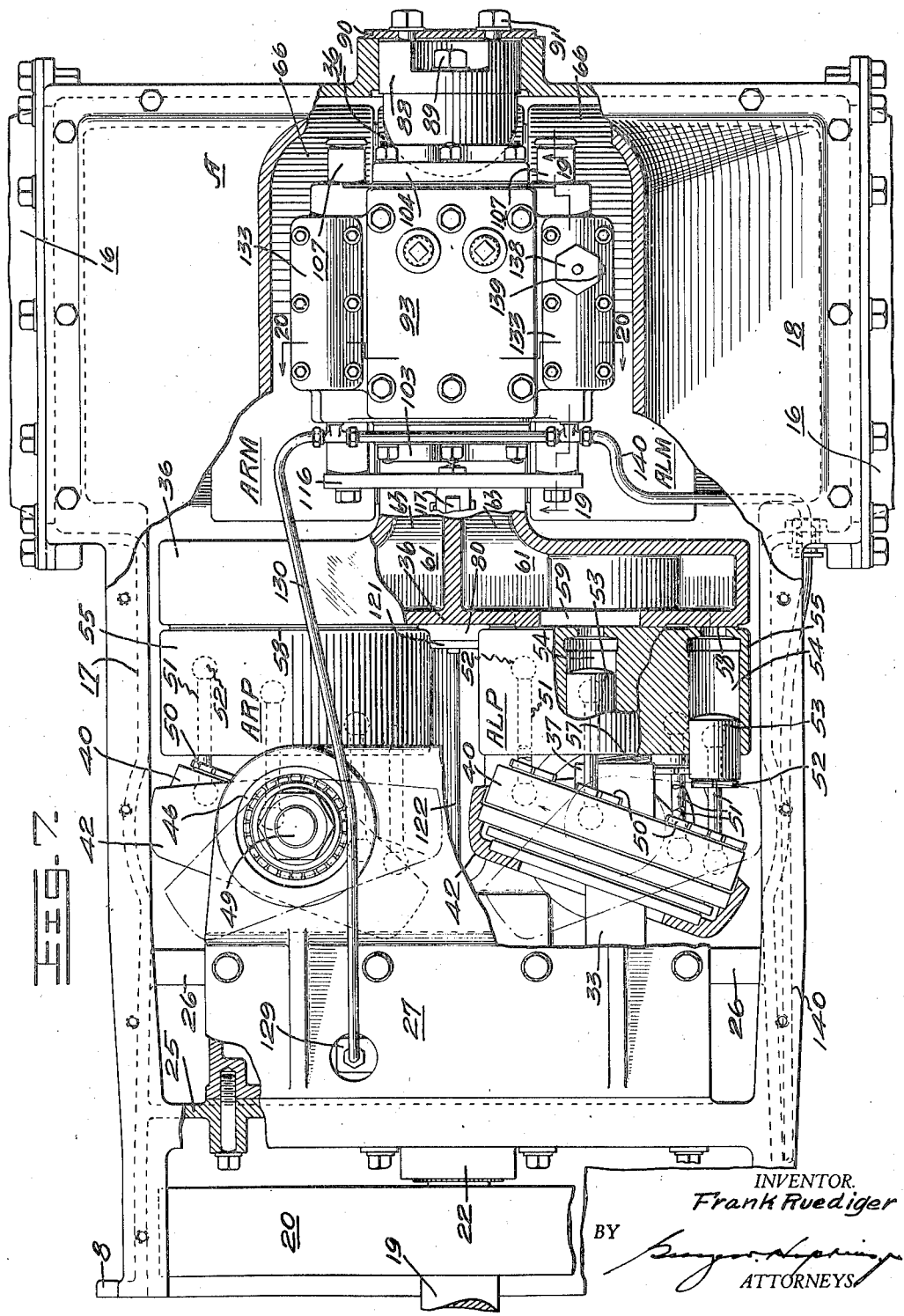

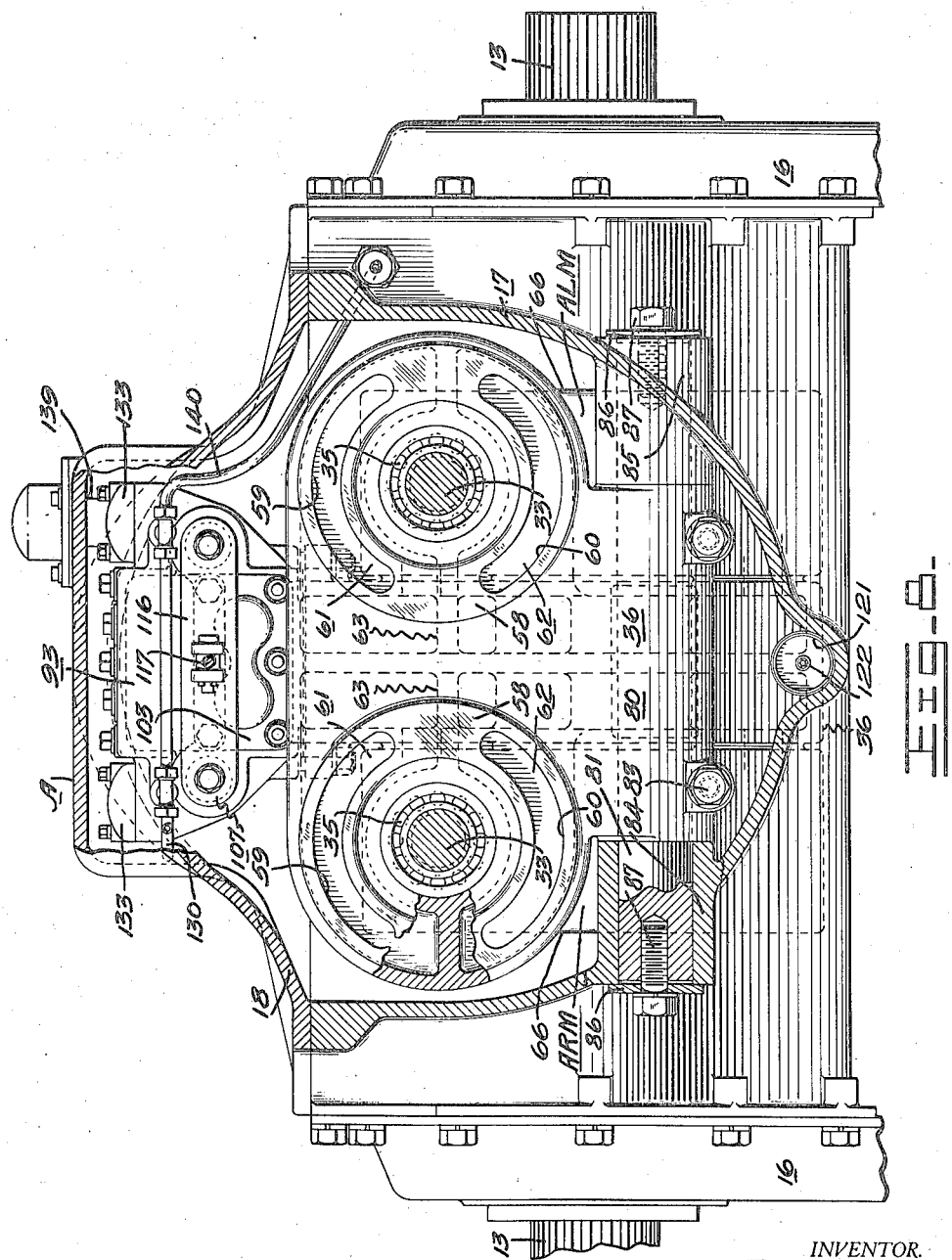

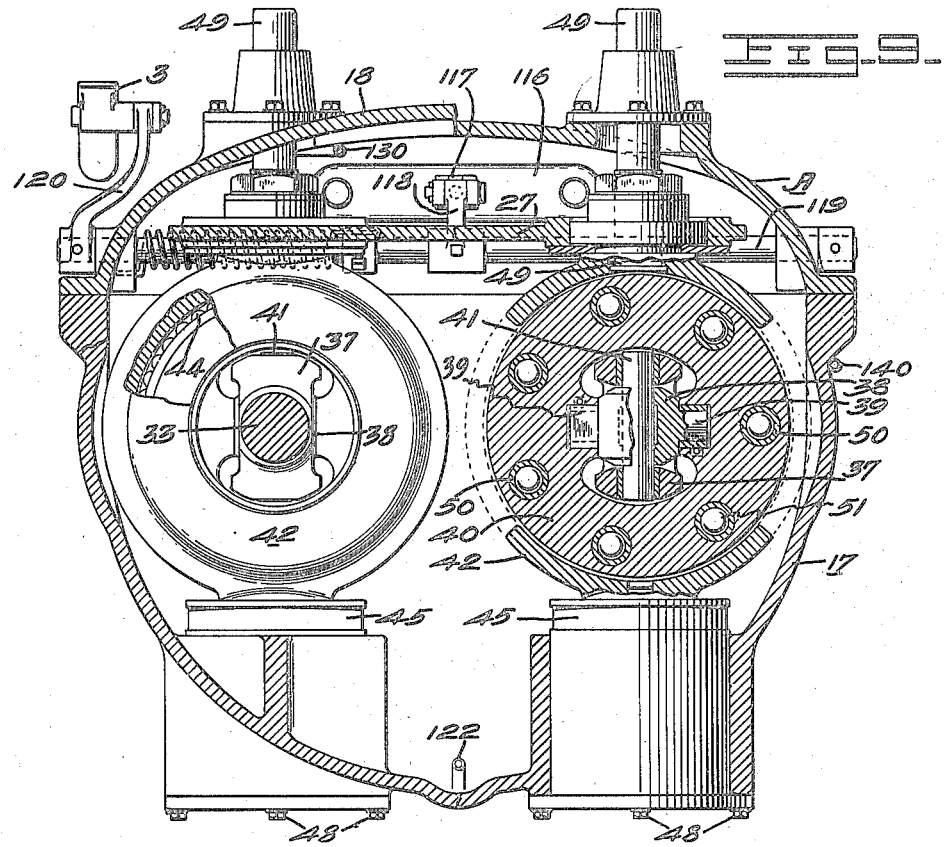
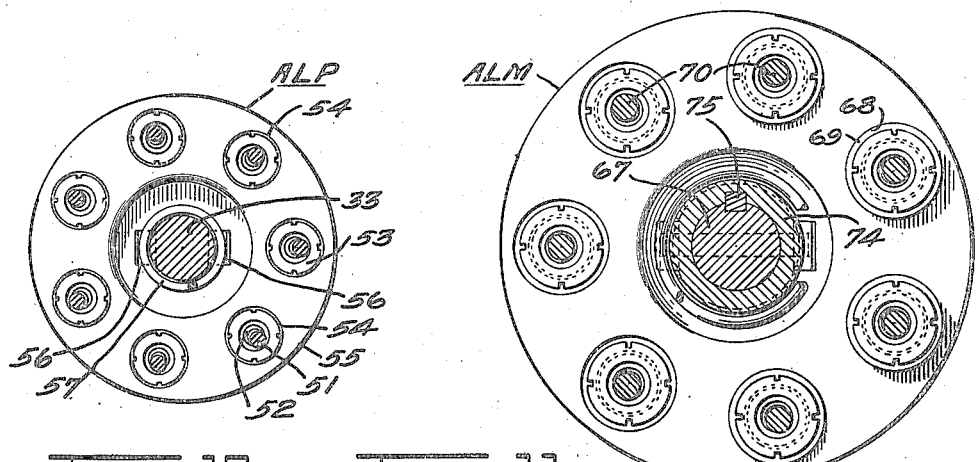

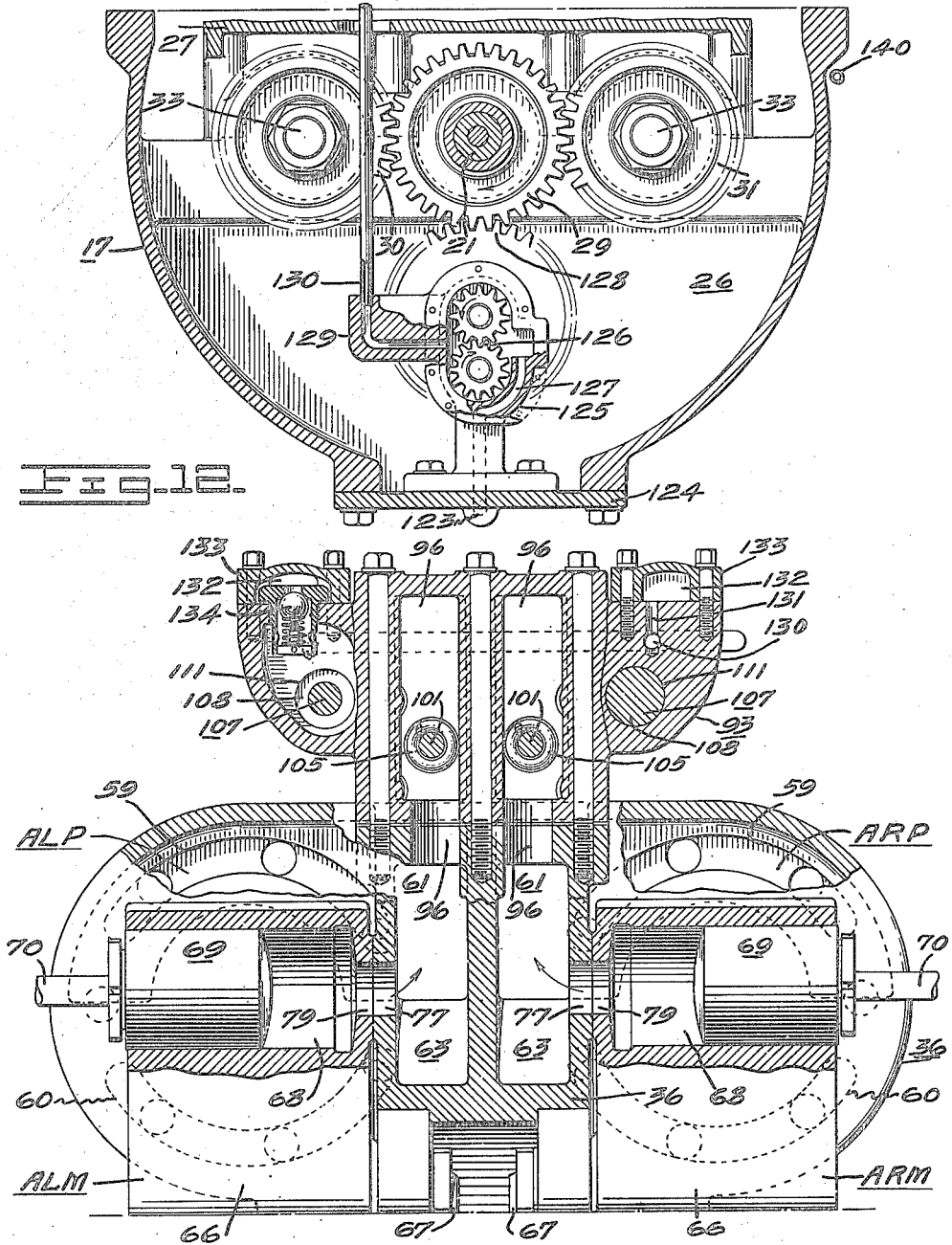

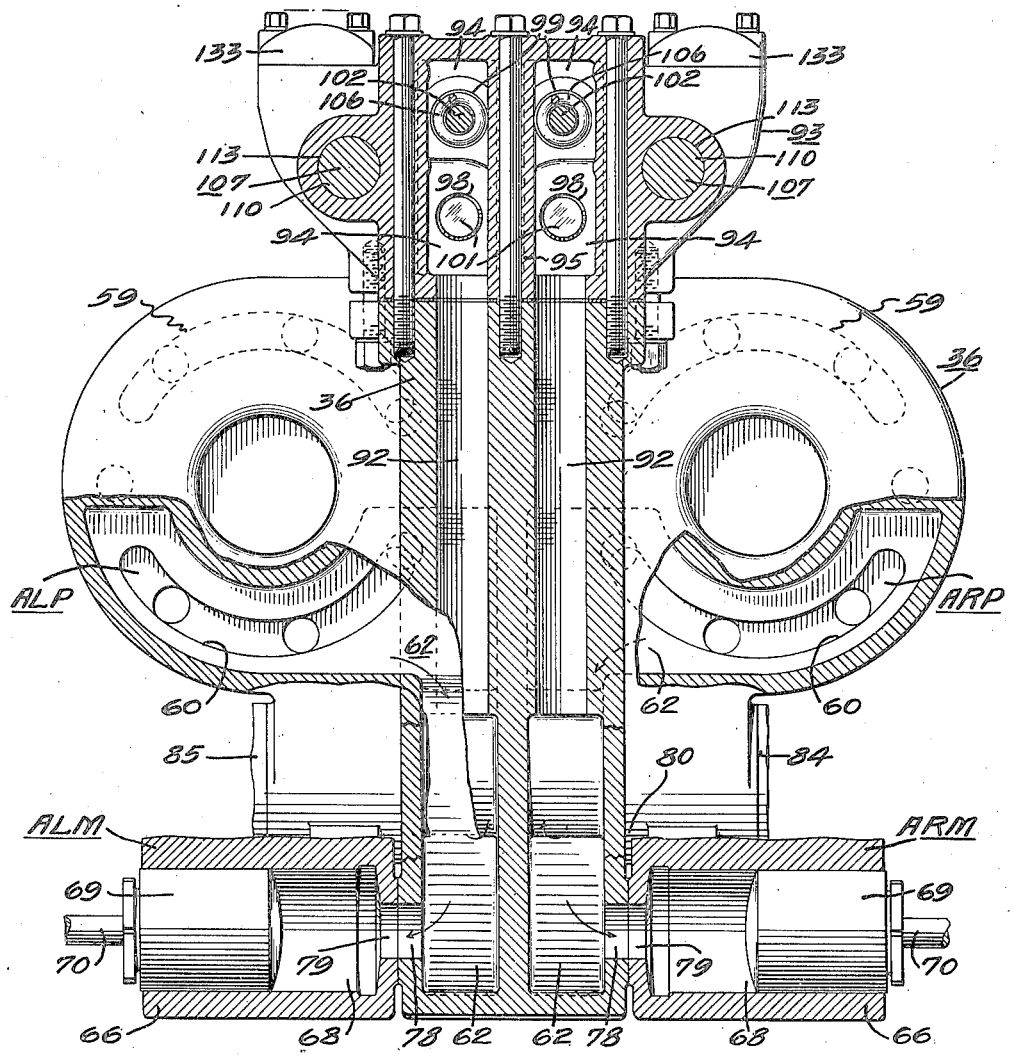

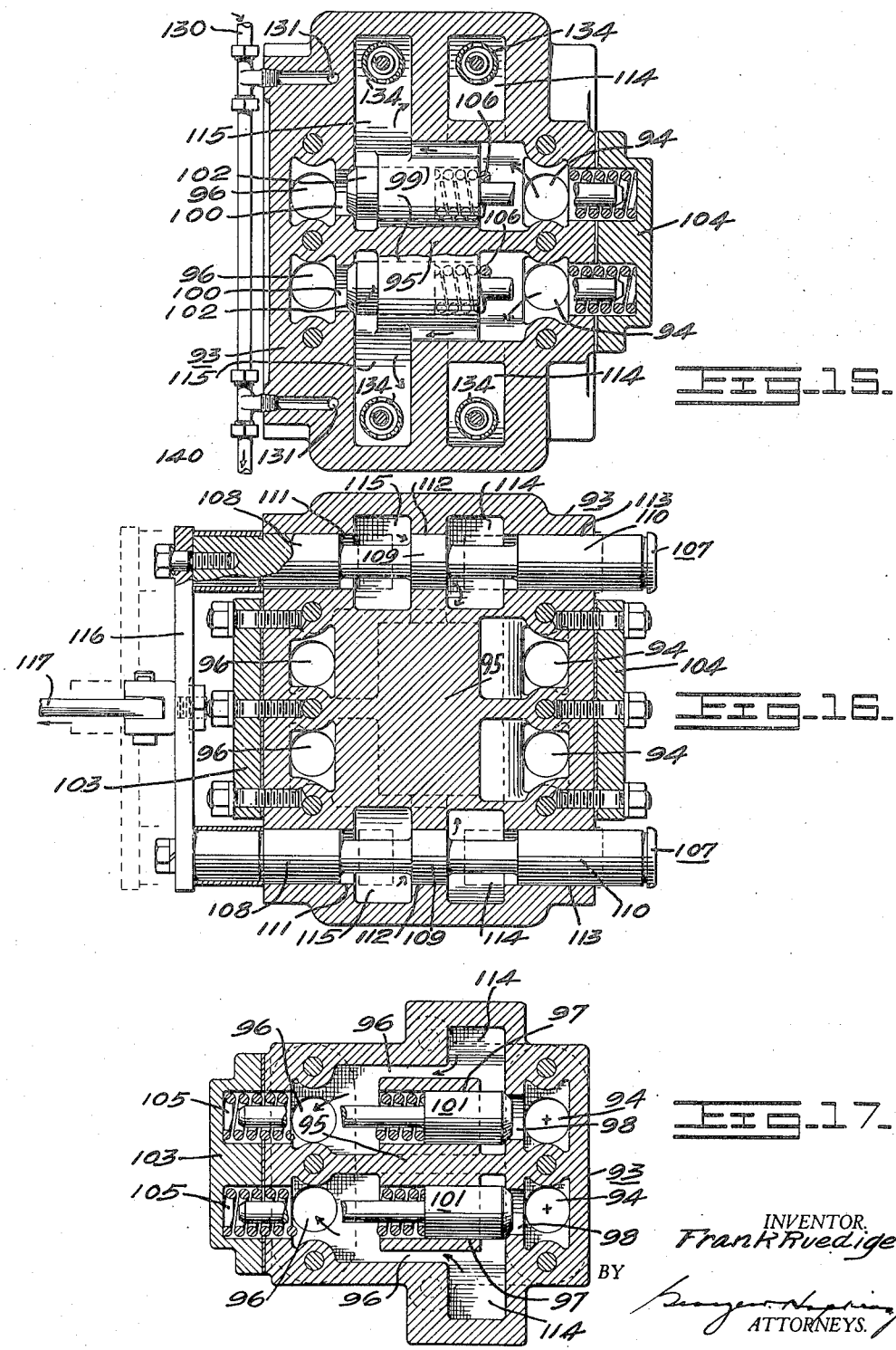

2,036,437

UNITED STATES PATENT OFFICE 2,036,437

MOTOR VEHICLE

Frank Ruediger, Oakland, Calif., assignor to Caterpillar Tractor Co., San Leandro, Calif., a corporation of California Application October 3, 1930, Serial No. 486,156

18 Claims. (Cl. 180—9.2)

My invention relates particularly to improvements in the transmission mechanism of motor vehicles: and the objects of my invention are: to provide a transmission mechanism which operates on the hydraulic principle which will be practical and dependable in operation and so designed as to be practical and economical to manufacture; to provide a hydraulic transmission suitable for use in motor vehicles; to provide a hydraulic transmission especially suitable for tractors of the track type where variable operation of the tracks is desirable; to construct a hydraulic transmission system without recourse to piping or piping connections, the use of which always decreases the dependability of any system; to equip the hydraulic transmission system with efficient and dependable safety devices to insure absolute safety in operation at all times and to eliminate the danger of breakage of parts due to the excessive building up of pressure in the system; to provide a hydraulic transmission mechanism which can be readily substituted for the usual gear transmission in a tractor because it can be manufactured as a compact unit; to provide a hydraulic transmission mechanism especially adapted for use in track type tractors and in which the controls are much simpler and more versatile than those ordinarily used for gear transmissions; and to provide a motor vehicle with a hydraulic transmission which can be adjusted so that the vehicle can be towed.

In the accompanying drawings is illustrated a preferred form of construction.

Description of figures

Fig. 5 is a section on line 5—5 in Fig. 4 to illustrate the mechanism for driving and controlling the pumps, the passages communicating between the pumps and the motor, and the safety valves.

Fig. 6 is a longitudinal section through the transmission casing, showing the mechanism therewithin in full with the exception of a few parts which have been broken away. This view serves to illustrate the relation between the pump, its controlling means, the motor, and the fluid supply and regulator systems.

Fig. 7 is a plan view of the transmission with a portion of the top of the casing broken away, and with one of the pumps partially broken away and in the pumping position.

Fig. 8 is a section on the line 8—8 in Fig. 4 showing the ports for the pumps and the means for supporting the front end of the block.

Fig. 9 is a section on line 9—9 in Fig. 4 illustrating the construction and method of supporting the pump control.

Fig. 10 is a front view of one pump taken on the line 10—10 in Fig. 4, the drive shaft and the piston rods being shown in section.

Fig. 11 is a similar view of one of the motors taken at line 11—11 in Fig. 4.

Fig. 12 is a section at the line 12—12 in Fig. 5 illustrating a portion of the fluid supply system.

Fig. 13 is a section at line 13 in Fig. 5 to illustrate the passages communicating between the pumps, the motor, and the regulator valve, as well as a portion of the fluid supply system.

Fig. 14 is a section on line 14 in Fig. 5, its purpose being somewhat the same as that of Fig. 13 but taken at a different point of the system.

Fig. 15 is a section on line 15 in Fig. 6 showing the arrangement of the fluid supply valves and the regulator valves.

Fig. 16 is a section on line 16 in Fig. 6 illustrating the cut-out valve mechanism.

Fig. 17 is a section on line 17 in Fig. 6 illustrating the lower set of safety valves and the passages associated therewith.

Description of mechanism

Figure 1:
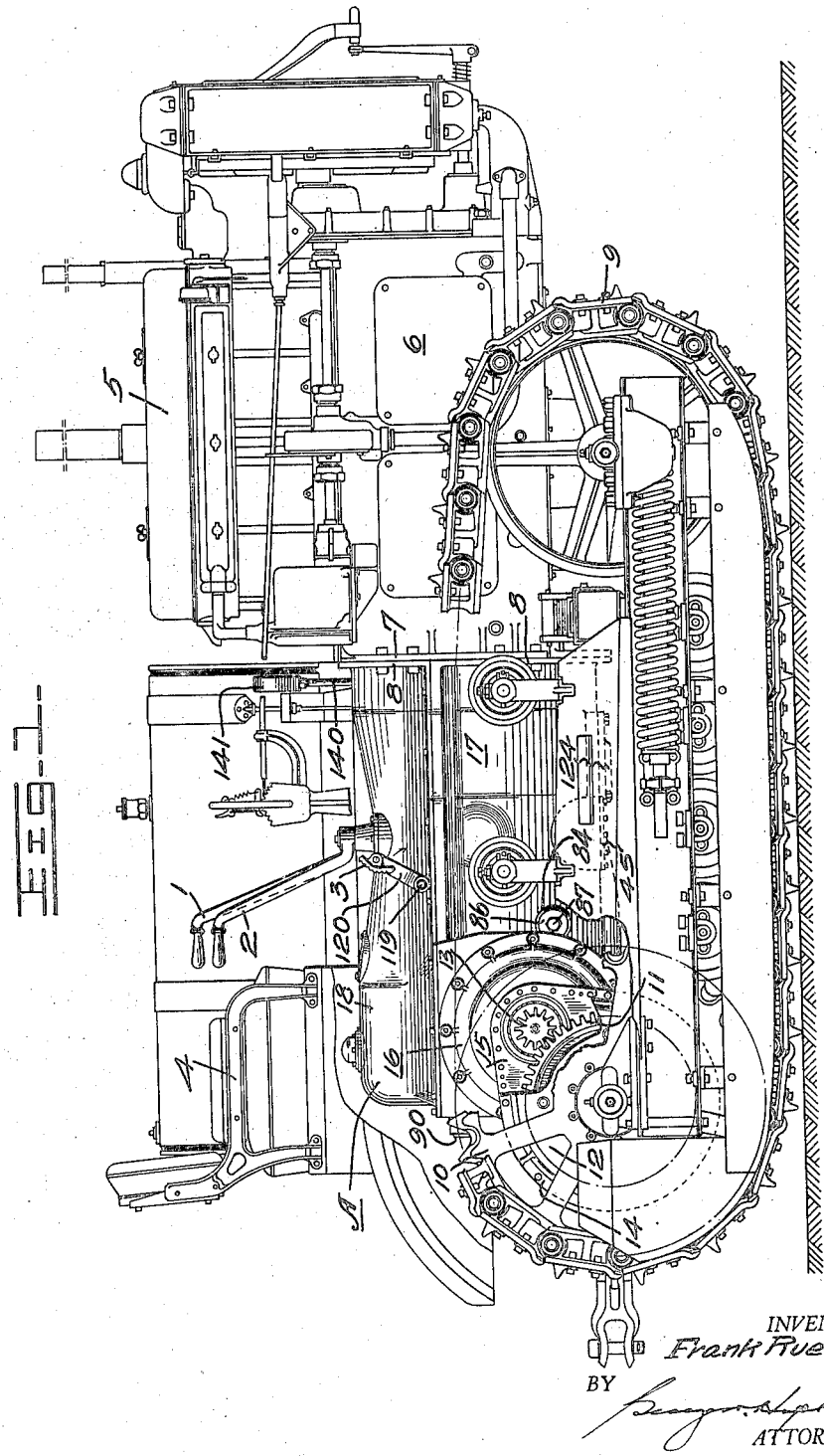
Fig. 1 is a right side elevation of a standard tractor in which the transmission has been installed.

The invention is shown as embodied in a hydraulic transmission designed to replace the standard gear transmission of a track type tractor as shown in Fig. 1. The transmission, designated by the reference character A in Fig. 1, is entirely enclosed within a housing. The track control levers 1 and 2 and the cutout pedal 3 which are attached to the control mechanism inside the casing suffice to give the operator seated at 4 complete control of the machine. The lever 1 serves to control the stopping, locking, starting, speed, and direction of operation of the left track and the lever 2 serves the same purpose for the right track. Cut-out pedal 3 is used to entirely break the transmission of any power to the tracks. A general description of the manner in which this novel transmission is installed in a tractor will also illustrate that the transmission may be designed to replace the usual gear transmission.

Figure 3:
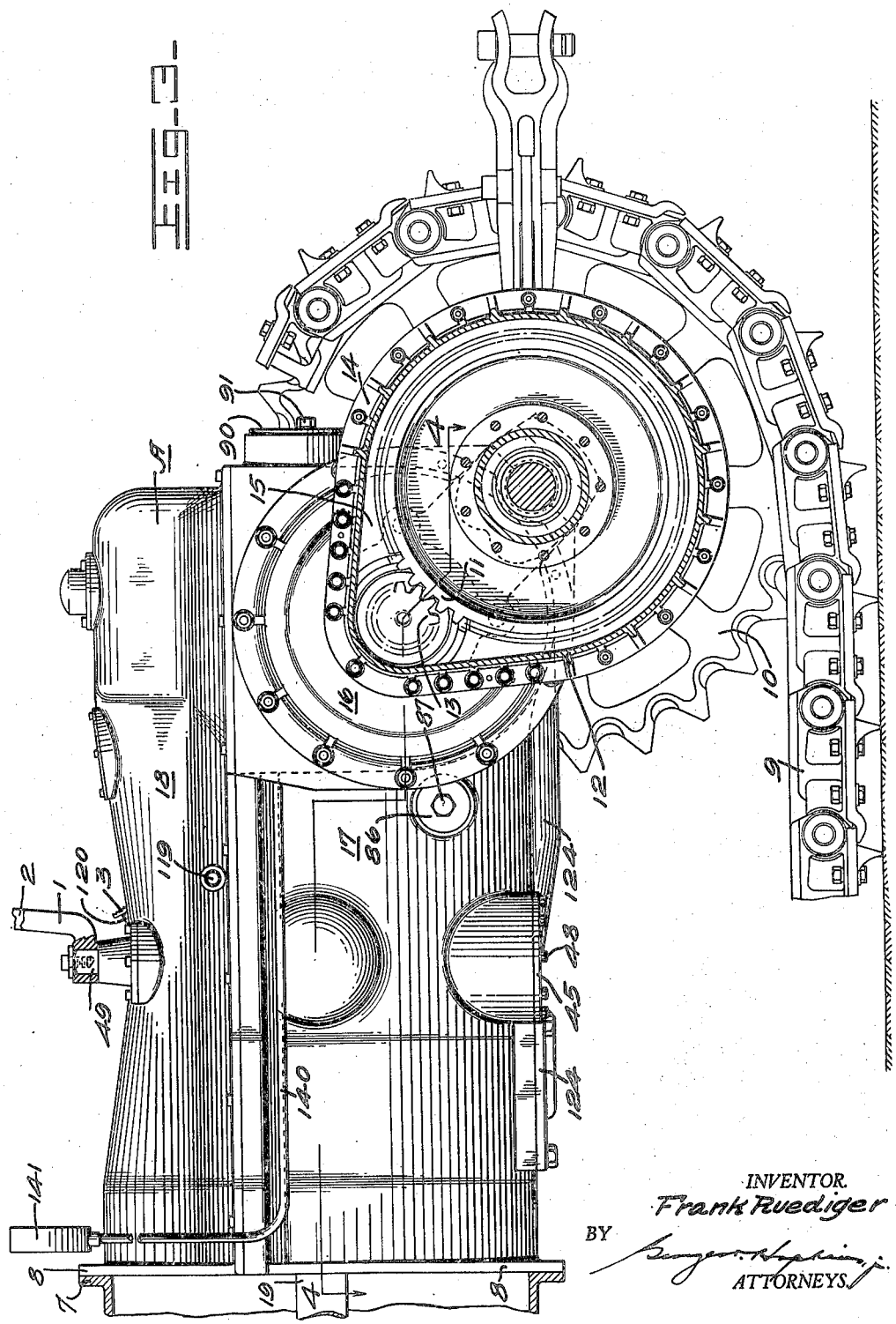
Fig. 3 is a view of the transmission and the final drive gears from the left of the machine on the line 3—3 in Fig. 2, a section being taken through the final drive gear housing.

As shown in Fig. 1, the tractor is equipped with conventional motor 5 including its crankcase 6, flanged at 7. Cooperating flanges 8 on the transmission casing enable crankcase and transmission casings to be rigidly bolted together, as will appear from Figs. 1 and 3. Tracks 9 are adapted to be driven by sprocket 10 in the customary manner. Operating integrally with each sprocket 10 is gear 11, situated within housing 12. Meshing with gear 11 is pinion 13, which is driven by the transmission mechanism presently to be described.

Figure 2:
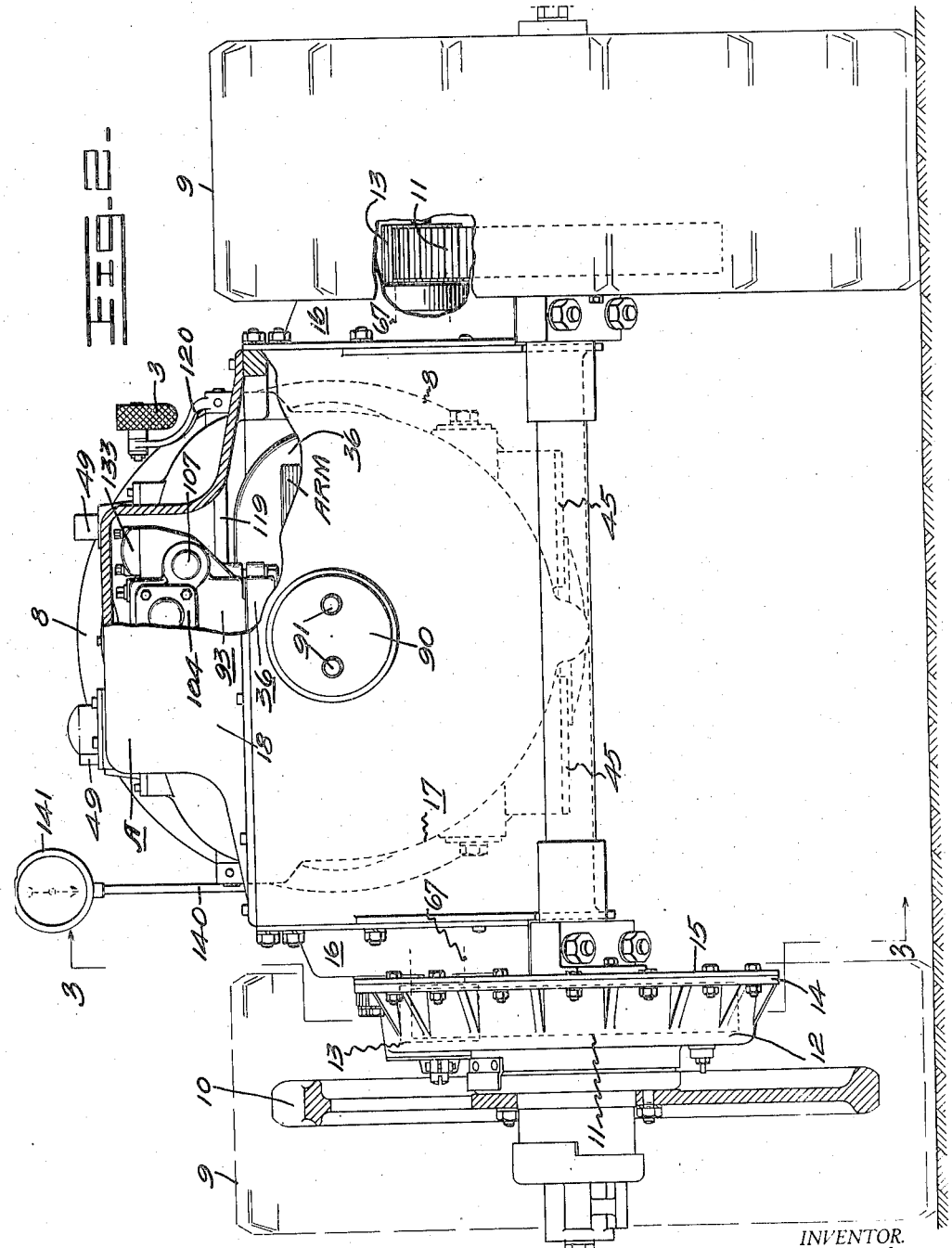
Fig. 2 is a rear elevation with parts of the transmission casing and the tractor driving mechanism broken away.

Housing 12 encloses gears 11 and 13 (Figs. 1, 2 and 3); the housing is suitably shaped and provided with flange 14 which is bolted to plate 15, fastened to the cover plate 16 bolted to main transmission casing 17.

The general arrangement of the parts of the transmission mechanism may be obtained from an inspection of Figs. 6, 7 and 8.

From Fig. 6 it will appear that the transmission mechanism is entirely enclosed within casing 17 and its cover 18. The flange 8, as previously described, is to enable the transmission to be bolted to the crank case.

Crankshaft 19 and flywheel 20 are shown in part in Fig. 6, and in Fig. 7, which is a plan view, where ARP designates generally the pump associated with the right transmission and ALP designates that associated with the left transmission. These two pumps are positively driven from crankshaft 19, which in normal operation is constantly rotating. Pump ARP operates motor ARM, and pump ALP operates motor ALM. Motor ARM is geared to the right track, while motor ALM is geared to the left track.

Figure 4:
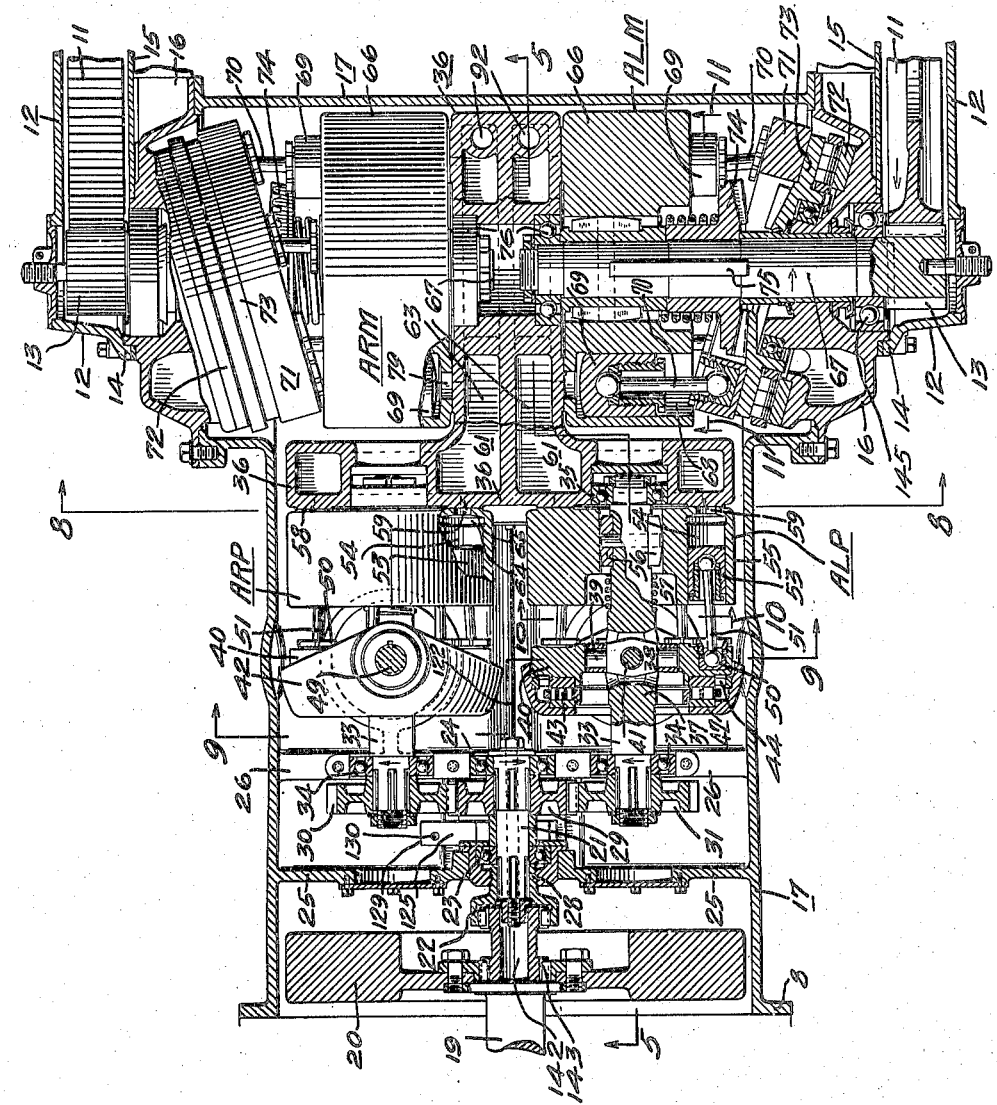
Fig. 4 is a sectional view taken on the line 4—4 in Fig. 3 to illustrate the general arrangement of the pumps and motors in the transmission.
Figure 18:
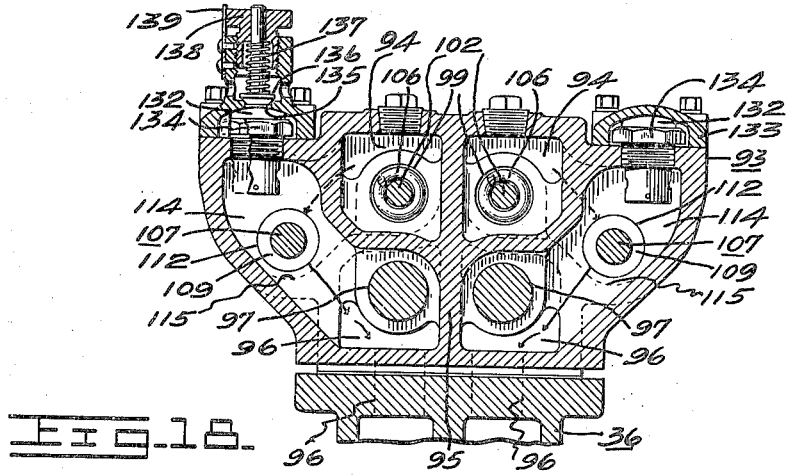
Fig. 18 is a section on line 18 in Fig. 6 illustrating the relationship in a transverse plane of the regulator valves with the fluid supply valves, and also showing the automatic release valve in the fluid supply system.

Proceeding now to examine the transmission more in detail and referring to Figs. 4 and 5, a short shaft 21 is coupled to the crankshaft 19 by means of a coupling 142 having external gear teeth on each end engaging internal teeth on ring gear members 143 and 22, attached to flywheel 20 and shaft 21, respectively. Thus, a telescopic connection obtains which permits connection or disengagement of the transmission to the drive shaft 19, by relative sliding movement of the transmission casing with respect to the motor shaft casing in assembling or disassembling the parts. The shaft 21 is supported in bearings 23 and 24; bearing 23 being in wall 25 in casing 17; bearing 24 is supported in partition 26 formed in casing 17 and is further positioned by the bracket 27, which is bolted both to wall 25 and partition 26. At 28 is shown a seal for shaft 21 which prevents egress of fluid from the transmission casing. Splined on shaft 21 is gear 29 which meshes with gears 30 and 31 splined on the pump drive shafts.

One shaft drives the right hand transmission mechanism while the other drives the left, and the shafts normally rotate in the direction of the arrows in Fig. 4. Since the two transmission mechanisms are duplicates, only one will be described.

Shaft 33 is supported at one end, adjacent gear 31, in bearing 34 located in partition 26, and further positioned by bracket 27. The other end of shaft 33 is journaled at 35 in a casting referred to as the block 36, which is rigidly supported in casing 17, as will be later described.

Pump ALP is mounted on shaft 33. At 37 the shaft is formed with an aperture to freely admit member 38 having outwardly projecting pivot pins 39 on which is pivoted ring 40. Member 38 is pivoted on pin 41 in shaft 33. Thus ring 40 is mounted for universal movement with respect to shaft 33, and also rotates with shaft 33. The position assumed by ring 40 is determined by guide plate 42 in which ring 40 runs on rollers 43 and 44. Guide plate 42 (Fig. 5) is provided with an upwardly extending portion and with a downwardly extending portion which are journaled in bracket 27 and removable cylinder 45, at 46 and 47, respectively. Cylinder 45 is bolted at 48 to the bottom of casing 17 to facilitate assembly. For the same reason bracket 27 is made removable. Shaft 49, attached in plate 42, extends upwardly out of top casing 18 to receive the handle which is operated by the operator. By this means guide plate 42 is rocked about a fixed vertical axis and the altering of the planar positions of plate 42 with respect to the axis of shaft 33 serves to guide the ring 40 during its rotation with shaft 33. Connected to ring 40 by means of ball and socket joints 50 are a series of piston rods 51, spaced apart circumferentially. Each of these piston rods has ball and socket connection at 52 with a piston 53 adapted to reciprocate in a cylinder 54. Cylinders 54 are bored in drum 55 which is keyed at 56 to shaft 33. Spring 57 presses drum 55 against block 36.

The cylinders, pistons, and piston rods, together with ring 40, all rotate in unison with shaft 33. When guide plate 42 is adjusted, as shown in Figs. 4 and 5, so that ring 40 is guided with its plane perpendicular to shaft 33, no reciprocation of the pistons in the cylinders takes place, and consequently there is no pumping. However, with the guide plate in any other position, pumping will take place in an amount and in a direction depending upon the adjustment of the guide plate.

Referring to Fig. 7, guide plate 42 is shown in the position in which a maximum pumping action is obtained in a direction to drive the left track forward. Ring 40 is rotating in the direction of the arrow. Each piston in being translated about the axis of shaft 33 from the left side of the machine to the right, completes a discharge stroke, and in returning from right to left, it performs a suction stroke. Conversely, with plate 42 adjusted in the dotted line position, a reverse pumping action is obtained; discharge will occur instead of suction, and suction instead of discharge. The stroke of the pistons also depends directly upon the adjustment of plate 42.

By adjusting plate 42, which is accomplished by turning shaft 49 as previously explained, the operator controls the action of the pump entirely.

He is enabled to start it pumping and likewise to stop it pumping by moving plate 42 from or to the perpendicular position. He is also able to govern its capacity, as well as its direction of pumping, by moving plate 42 on either side of the perpendicular position required amounts.

The manner in which the pump is connected to and operates the motor will now be described. The fluid which is received by the pump ALP, as well as the fluid which it discharges, is contained in passages in block 36, rigidly mounted in case 17. Block 36 is provided with bosses 58 which are smooth-surfaced for contact with the corresponding surface on the rear face of drum 55. As shown in Fig. 8, the boss 58 is provided with arcuate apertures 59 and 60 which communicate with passages 61 and 62, respectively. Upper and lower passages 61 and 62 are formed in the block 36 and are entirely separated from each other, for example, as by partition 63, Fig. 5. The pressure of the fluid acts upon annular surface 65 to press drum 55 toward block 36 to prevent leakage.

Motor ALM is structurally quite similar to pump ALP. It consists of drum 66 keyed to a shaft 67, cylinders 68, pistons 69, piston rods 70, and a ring 71 in which the ends of the rods are retained for universal movement. Ring 71, however, is guided in a stationary bearing 72 and ring 71, instead of being mounted in shaft 67, is fastened to bevel gear 73 which meshes with bevel gear 74 keyed at 75 to shaft 67. Shaft 67 is mounted in bearing in block 36 at 76, and in the cover plate 16 at 145. Formed preferably integrally with shaft 67 is driving pinion 13, which has already been described.

No adjustment of the parts of the motor is required; control of the pump governs the operation of the motor.

The relation of drum 66 to block 36 is similar to that of drum 55 to block 36. Block 36 is provided with arcuate ports 77 and 78; port 77 communicates with upper passage 61, and port 78 communicates with lower passage 62. Openings 79 in the end of the cylinders 68 by registering with arcuate ports 77 and 78 control the inflow and outflow of fluid from the cylinders to the upper or lower passage as the case may be.

With plate 42 adjusted as shown dotted in Fig. 7 to cause suction while cylinders 54 are in register with ports 59 and in communication with passage 61, fluid will be drawn out of cylinders 68 standing in register with port 77. Cylinders 54 in register with port 60 will be discharging fluid into passage 62, thereby applying pressure to pistons 69 whose cylinders are in register with port 78. Under these conditions a counter-clockwise rotation of shaft 67 (viewed from the left side of the machine) will result. With plate 42 adjusted as shown in full in Fig. 7 so that the upper passage becomes the discharge passage and the lower passage becomes the suction passage, the motor will be reversed and shaft 67 will be turned in clockwise direction. This would be the direction of operation to cause forward action of the left track.

The method of supporting block 36 in casing 17 will now be described (Figs. 5, 7, and 8). Block 36 is provided with a boss 80 which is bored to receive pin 81 and split, as at 82, so that the block can be clamped by cap screws 83 to shaft 81. Shaft 81 is removably fastened in bosses 84 and 85 formed in casing 17, and cover plates 86 held to shaft 81 by cap screws 87 maintain shaft 81 properly positioned in bosses 84 and 85. The rear end of block 36 is supported in casing 17 by means of a protuberance 88 which is attached, as at 89, to block 36 and which is held in place with respect to casing 17 by means of cover plate 90 and cap screws 91. In this manner, block 36 is provided ample support in the casing and at the same time can be readily assembled.

In order to avoid injury to the mechanism, it is necessary to provide safety valves in the fluid circuit, so that if for any reason excessive pressures should be obtained on the pressure side, the fluid would be automatically by-passed to keep the fluid pressure within safe limits. To this end, it will be noted in Fig. 5 that lower passage 62 is in communication with the upwardly extending passage 92 formed in the block 36. The safety valves are mounted in a box 93 which is bolted to block 36 so that cored passage 94 is in register with passage 92. A central support 95 is provided in the valve box as a support for the valves and it serves also as the partition between passage 94 and passage 96 which communicates with upper passage 61. Support 95 is bored at 97, 98, 99 and 100, to form guides and seats for valves 101 and 102, respectively. The valves are readily removable by detaching caps 103 and 104, which serve to retain springs 105 and 106 which bear against valves 101 and 102 to maintain them on their seats 98 and 100. Should the pressure in the lower passage become excessive, the fluid would be by-passed through passage 94, valve 101, passage 96, to the suction side. Conversely, if the pressure should become excessive in the upper passage 61, the fluid would by-pass through the valve 102.

When it becomes desirable to tow the tractor, it is necessary to cut out the transmission 40 which otherwise would act as a positive brake. This is done by opening a special by-pass valve between the lower passage and the upper passage, and for this purpose the valve box 93 is provided with a balanced valve 107 (Fig. 16) comprising three cylindrical portions of like diameter 108, 109 and 110, the box 93 being bored at 111, 112 and 113 to receive said cylindrical portions, respectively. On either side of the portion 109, when it is seated at 112, there are chambers 114 and 115. Chamber 115 communicates with passage 94, as shown in Fig. 15; chamber 114 communicates with passage 96 as shown in Fig. 17. When valve 107 is operated to move the portion 109 from its seat 112, chambers 114 and 115 are in communication and fluid may flow from upper passage 61 to lower passage 62 or the reverse. Cut-out valves 107 are simultaneously operated by means of an interconnecting bar 116 to which is centrally connected rod 117 pivotly connected to a crank 118 (Fig. 6) on shaft 119 which extends outside the cover plate 18 where it is provided with foot lever 120 which the operator depresses, moving rod 117 in the direction of the arrow in Fig. 5 to move bar 116 to the dotted position in Fig. 16, thereby opening the by-pass valves 107 to cut out the transmission. The operator may also use foot lever 120 to instantly cut off power transmission during operation of the tractor if he so desires.

Figure 19:
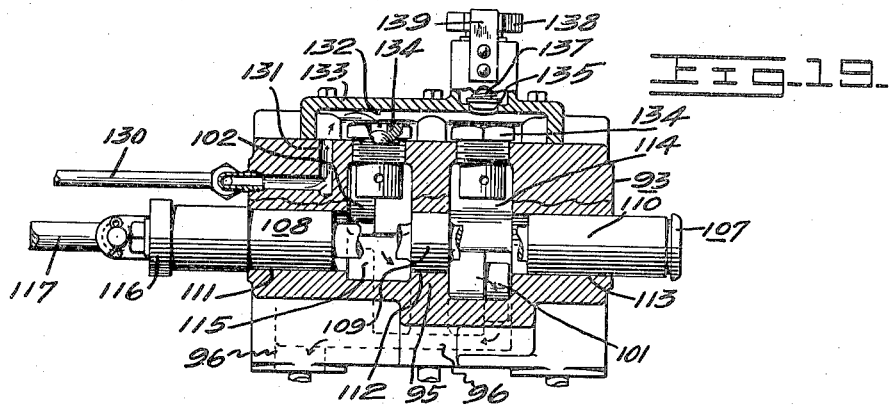
Fig. 19 is a section on line 19 in Fig. 7 illustrating the relation between the cut-out valve and the fluid supply valve.
Figure 20:
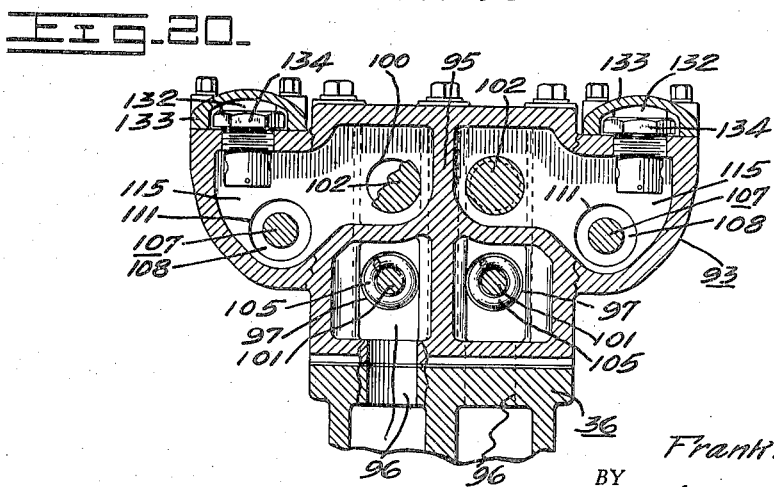
Fig. 20 is a section on line 20—20 in Fig. 7 and is another transverse section to illustrate the construction of the passages communicating with the several valves.

In order to compensate for any leakage, oil is drawn from the bottom of casing 17 preferably through screen 121 (Fig. 6), suction pipe 122, cored passage 123 in cover plate 124, which supports casing 125 (Fig. 12) containing gear pump 126. Casing 125 is cored, as at 127, to form a passage from the gears 126 to cored passage 123 and suction pipe 122. The gear pump is driven from gear 29 on drive shaft 21, by means of gear 128. The discharge side of the gear pump 126, shown at 129 in Fig. 12, is connected by means of pipe 130 (Figs. 6 and 12) with valve box 93, as shown in Figs. 7, 15 and 19. Box 93 is drilled at 131 so that the fluid from the gear pump is supplied to a chamber 132 enclosed by cover plate 133. Seated in chamber 132 and communicating with chambers 114 and 115 are check valves 134 shown in detail in Fig. 13.

By this means, any leakage of fluid from the power transmission system immediately results in the opening of one or more of the check valves 134 to admit replenishing fluid.

Chamber 132 is apertured at 135 to form a seat for relief valve 136 which is held on its seat by spring 137, the compression of which can be adjusted by rotation of screw plug retainer 138 which is resiliently held in adjusted position by leaf spring 139. Excess fluid pumped into chamber 132 by the gear pump escapes through relief valve 136 and returns to the bottom of casing 17. A further purpose of relief valve 136 is to permit the escape of any air which may have entered the transmission system, and for this reason relief valve 136 is located at the highest point in the system.

Fig. 7 shows that pipe 130 may be extended as shown at 140 to the outside of the machine in order that a suitable gauge 141 can be located at a point on the tractor where the operator can conveniently observe the operation of the fluid supply pump.

I therefore claim as my invention:

1. In a motor vehicle, a hydraulic transmission, a casing, a partition wall in said casing, a wall in said casing, a pump drive shaft extending toward said partition wall, a drive shaft extending through said partition wall toward said wall, and slidably engaged gear means connecting said shafts, whereby movement of said shafts apart serves to interrupt the drive connection between said shafts.

2. In a motor vehicle, a hydraulic transmission, a casing, a wall partitioning off said casing, two hydraulic pumps on one side of said wall, each pump having an operating shaft extending through said wall, a drive shaft on the other side of said wall, a connecting shaft extending through said wall to drive said pumps from said shaft, and means on said other side of said wall connecting said operating and said connecting shafts.

3. In a motor vehicle, a hydraulic transmission, a casing, a wall partitioning off said casing, a hydraulic pump on one side of said wall and having an operating shaft extending through said wall, a drive shaft on the other side of said wall, a connecting shaft extending through said wall, means detachably connecting said drive shaft to said connecting shaft, and means on said other side of said wall connecting said operating and connecting shafts.

4. In a motor vehicle, a hydraulic transmission, a casing, a wall partitioning off said casing, a hydraulic pump on one side of said wall, a drive shaft on the other side of said wall, a connecting shaft extending through said wall, means detachably connecting said drive shaft to said connecting shaft, and gear means between said connecting shaft and said pump.

5. In a motor vehicle, a hydraulic transmission unit comprising a casing, a pair of hydraulic pump mechanisms in said casing, a motor mechanism for each pump supported by said casing, and traction unit driving mechanism driven by said motors and supported by said casing.

6. In a motor vehicle, a member having two hollow walls extending normal to each other, a pair of fluid pump mechanisms discharging into one of said hollow walls, and a pair of motor mechanisms deriving fluid from the other of said hollow walls, said hollow walls forming independent passages between the pump mechanisms and the motor mechanisms.

7. In a motor vehicle, two traction devices, a hydraulic transmission including a motor for each of said devices, a casing therefor having an aperture through which each motor can be placed in operative position, said casing providing a unitary housing structure for said motors, a cover for each of said apertures to support one of said motors and retain said supported motor operatively in position, each cover and casing serving to support a traction device.

8. In a motor vehicle, a source of power, a pair of traction devices, a hydraulic transmission including a pair of pump and motor sets for transmitting power from said source to said traction devices, separate means for controlling application of each of said sets to lock or drive an associated traction device at variable speed in either direction, and a single control for rendering said sets inoperative and said control means ineffective.

9. In a motor vehicle, a source of power, a pair of traction devices, a hydraulic transmission including a pair of pump and motor sets for transmitting power from said source to said traction devices and normally operative to drive or lock said traction devices, and a single means for rendering both of said sets inoperative.

10. In a self-propelled motor vehicle having traction devices of the class which are adapted to be positively driven together or relatively with respect to each other and either forwardly or rearwardly to provide for both maneuvering and propulsion of said vehicle, a main frame for said vehicle having a hollow portion adapted to contain a hydraulic transmission, a prime mover serving as a source of power for said traction devices and mounted on said main frame, a speed and torque change hydraulic transmission within said hollow portion of said main frame, said hydraulic transmission being interconnected between said prime mover and said traction devices, said hollow portion of said main frame being provided with suitable openings through which parts of said transmission including a hydraulic pump and a hydraulic motor can be inserted, and means extending from within to without said hollow portion of said main frame for controlling said hydraulic transmission, said traction devices being mounted on said main frame.

11. In a self-propelled motor vehicle having traction devices of the class which are adapted to be positively driven together or relatively with respect to each other and either forwardly or rearwardly to provide for both maneuvering and propulsion of said vehicle, a main frame for said vehicle having a hollow portion adapted to contain a hydraulic transmission, a prime mover serving as a source of power for said traction devices and mounted on said main frame, a speed and torque change hydraulic transmission unit including a hydraulic pump part having a shaft and a hydraulic motor part having a shaft interconnected between each traction device and said prime mover, said pump parts being arranged in said hollow portion of said main frame with their shafts substantially parallel, said motor parts being arranged in said hollow portion of said main frame with their shafts substantially in coaxial alinement and extending transversely with respect to the longitudinal axis of said vehicle, said hollow portion of said main frame being provided with an opening in each side through which a motor part can be inserted, a structure within said hollow portion of said main frame secured rigidly to the main frame and adapted to support and position the pump part and the motor part shafts of the transmission, said structure having passages for conducting fluid between each pump part and its associated motor part, and an individual control for each transmission unit extending from within to without said hollow portion of said main frame, said traction devices being mounted on said main frame.

12. In a self-propelled motor vehicle having traction devices of the class which are adapted to be positively driven together or relatively with respect to each other and either forwardly or rearwardly to provide for both maneuvering and propulsion of said vehicle, a prime mover serving as a source of power for said traction devices, a hydraulic transmission unit interconnected between each traction device and said prime mover, each of said hydraulic transmission units including a pump part having a shaft, the prime mover having a drive shaft, a gear on said drive shaft, a gear on each of said pump part shafts and meshing with said gear on said drive shaft whereby said pump parts can be actuated simultaneously to operate both said traction devices together, and individual control means for each of said hydraulic transmission units whereby said traction devices can be caused to operate differently or one at a time.

13. In a self-propelled motor vehicle having traction devices of the class which are adapted to be positively driven together or relatively with respect to each other and either forwardly or rearwardly to provide for both maneuvering and propulsion of said vehicle; a prime mover serving as a source of power for said traction devices; a hydraulic speed and torque change transmission interconnected between said traction devices and said prime mover, said transmission including a plurality of hydraulic pump and motor parts and a structurally integral unit interposed between said parts, said structurally integral unit having passages therein for conduction of fluid from one of said parts to another; and another structurally integral unit having a hollow portion for providing the sole housing for said first-mentioned structurally integral unit and said parts and for serving as a fluid reservoir for said transmission, said another structurally integral unit being the main frame of said vehicle and serving as the support for said first-mentioned structurally integral unit, said traction devices, and said prime mover.

14. In a motor vehicle, a hydraulic transmission comprising two pump and motor units, each pump and motor having a rotatable shaft and a cylinder block mounted on the shaft, the pumps being positioned with their shafts parallel, the motors being positioned with their shafts in alinement and extending transversely with respect to said pump shafts, a T-shaped structurally integral member having openings in which the ends of said shafts extend, the pumps having their cylinder blocks abutting the bar of said T on opposite sides of the leg of said T, the motors having their cylinder blocks abutting the leg of said T at opposite sides thereof, said T-shaped member having two pairs of passages, each pair of passages connecting the pump and the motor of a pump and motor unit, the pairs of passages being separated by a partition wall in the leg of said T, and a casing serving to house all of said pumps and motors and said structurally integral unit, each of said pumps, motors and structurally integral units being capable of separate insertion into said casing, and means for controlling each of said pump and motor units individually.

15. In a motor vehicle having traction devices of the class which are adapted to be positively driven together or relatively with respect to each other and either forwardly or rearwardly to provide for both maneuvering and propulsion of said vehicle, a prime mover serving as a source of power for said traction devices, a speed and torque change hydraulic transmission unit interconnected between each traction device and said prime mover, each unit including a pump part and a motor part, and a structurally integral unit providing the main frame of said machine, said structurally integral unit having a hollow casing portion into which each of said parts can be separately inserted and providing the sole housing for all of said parts, said hollow portion also serving as the fluid reservoir for all of said transmission units.

16. In a motor vehicle, a T-shaped casing, a pair of hydraulic motors having shaft ends extending through opposite ends of the bar portion of said casing, opposite traction units, each traction unit including means for transmitting power thereto, means on each shaft end engaging the associated power transmitting means, and opposite casings, enclosing said power transmitting means and secured on said first casing at the ends of the bar portion thereof.

17. In a self-propelled motor vehicle having traction devices adapted to be positively driven to provide for both maneuvering and propulsion of said vehicle, a main frame for said vehicle having a hollow portion adapted to contain a hydraulic transmission, each side of said hollow portion being provided with an aperture, a prime mover serving as a source of power for said traction devices and mounted on said main frame, a speed and torque change hydraulic transmission within said hollow portion of said main frame including opposite motors alined with said apertures and having drive shafts arranged substantially coaxially in alinement, and drive connections between said traction devices and said motor drive shafts, said traction devices being connected to said main frame.

18. In a self-propelled motor vehicle having traction devices of the class which are adapted to be positively driven together or relatively with respect to each other and either forwardly or rearwardly to provide for both maneuvering and propulsion of said vehicle, a main frame for said vehicle having a hollow portion adapted to contain a hydraulic transmission, a prime mover serving as a source of power for said traction devices and mounted on said main frame, a speed and torque change hydraulic transmission within said hollow portion of said main frame, said hydraulic transmission including pumping mechanism connected to said prime mover and motor mechanism connected with the traction devices, said hollow portion of said main frame being apertured for insertion of said pumping and motor mechanisms, and means extending from within to without said hollow portion of said main frame for controlling said hydraulic transmission, said traction devices being mounted on said main frame.

FRANK RUEDIGER.